United States Patent
Sorge

(10) Patent No.: US 7,095,033 B2
(45) Date of Patent: Aug. 22, 2006

(54) MULTI-SIDED DIE WITH AUTHENTICATING CHARACTERISTICS AND METHOD FOR AUTHENTICATING SAME

(76) Inventor: Nicholas Sorge, 7 Susan Ct., Deer Park, NY (US) 11729

( * ) Notice: Subject to any disclaimer, the term of this patent is extended or adjusted under 35 U.S.C. 154(b) by 298 days.

(21) Appl. No.: 10/833,217

(22) Filed: Apr. 27, 2004

(65) Prior Publication Data

US 2005/0236581 A1    Oct. 27, 2005

(51) Int. Cl.
*G01N 21/64* (2006.01)
*A63F 9/04* (2006.01)

(52) U.S. Cl. ............ 250/461.1; 250/271; 273/146
(58) Field of Classification Search ............ 250/461.1, 250/271, 458.1, 259.1; 273/146
See application file for complete search history.

(56) References Cited

U.S. PATENT DOCUMENTS 5,909,874 A    6/1999  Daniel et al.
6,596,351 B1 *  7/2003  Thompson .................... 428/7
2003/0218299 A1 * 11/2003  Zapata ...................... 273/146
2005/0235848 A1 * 10/2005  Butland ..................... 101/333

OTHER PUBLICATIONS

"How Black Lights Work" http://electronics.howstuffworks.com/black-light.htm (Visited on Jan. 23, 2004) (enclosed).

* cited by examiner

*Primary Examiner*—Albert Gagliardi
(74) *Attorney, Agent, or Firm*—Collard & Roe, P.C.

(57) ABSTRACT

A system and method for authenticating a multi-sided die by viewing the die under invisible ultraviolet light. A die body has a plurality of sides of substantially equal area. A plurality of visible markings for indicating a roll of the die are disposed on the die sides. One or more of the markings include a substance which visibly reacts with invisible ultraviolet light. One or more authentication marks including a substance which visibly reacts with invisible ultraviolet light are arranged in a selected pattern on one or more of the die sides. A position of the authentication mark or marks in the selected pattern corresponds to the visible marking having a substance which visibly reacts with invisible ultraviolet light. An overlay key correlates the position of the authentication mark with the visible marking.

8 Claims, 2 Drawing Sheets

MULTI-SIDED DIE WITH AUTHENTICATING CHARACTERISTICS AND METHOD FOR AUTHENTICATING SAME

BACKGROUND OF THE INVENTION

1. Field of the Invention

The invention relates to multi-sided die used in games of chance. More particularly, the invention relates to a system for verifying the authenticity of a multi-sided die which is provided with distinguishing characteristics not readily apparent upon ordinary observation. The invention further relates to a method for authenticating such a die.

2. The Prior Art

Multi-sided die or dice are commonly used in games of chance. A die typically comprises a lightweight multi-sided rigid article which is easily shaken, rolled, tossed, thrown or otherwise set into rotational motion by a player. Each side of a die is provided with a visual marking, for example one or more dots or numerals. The visual marking which faces directly up after the die has been set into rotational motion and has come to rest is the result of that throw or roll. A multi-sided die comprising twenty sides is known from U.S. Pat. No. 5,909,874 entitled "Icosahedron Decimal Dice."

When die are used in gambling or wagering, a result of a roll of a die or dice may determine an exchange of money or chips. Accordingly, substantial efforts are made to assure that die used for such purposes are balanced and otherwise adapted to provide an equal chance of rolling any particular result.

A player engaged in a game of chance in which money or chips are exchanged depending on a result of a roll of a die or dice may surreptitiously introduce an altered die or dice into a game in an attempt to skew the odds of obtaining a desired or favorable outcome. Accordingly, there exists a need to assure that a die being used for gambling or wagering purposes is authentic and has not been substituted with a die which is inauthentic and may have been altered to change the probability of rolling any particular result.

It is known to use a source of invisible ultraviolet light, such as a black light, to cause a material or substance including phosphors to react visibly or glow.

SUMMARY OF THE INVENTION

The invention relates to a system for quickly and easily verifying the authenticity of a multi-sided die which has distinguishing characteristics that are not readily apparent upon ordinary observation.

A die has a plurality of sides, preferably twenty sides, each side having an equal area. Visible markings, preferably in a form of Arabic numbers, which represent a result of a roll of the die are disposed on each side. One or more of the visible markings include a substance which reacts visibly in the presence of invisible ultraviolet light. One or more authentication marks comprising a substance which reacts visibly in the presence of invisible ultraviolet light are disposed on one or more sides of the die in a predetermined pattern, preferably in a circular pattern.

An overlay key for correlating a position of an authentication mark to a visible marking including the ultraviolet light reacting substance can be placed over and aligned with a side of the die having an authentication mark. The overlay key may preferably be a thin transparent device having visible marks corresponding to visible markings on the sides of the die and arranged in a pattern corresponding to a pattern of authentication marks on a side of the die. A source of ultraviolet light is used to visually confirm that an authentication mark conforms to a visible marking including the ultraviolet light reacting substance.

One benefit of the invention is that a system is provided for quickly and easily verifying the authenticity of a dice or die. Another benefit of the invention is that the authenticating characteristics of the die are not readily observable upon ordinary inspection. A further benefit of the invention is that a multitude of coding combinations are made available to distinguish a die provided with authenticating characteristics according to an embodiment of the invention.

BRIEF DESCRIPTION OF THE DRAWINGS

Other benefits and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
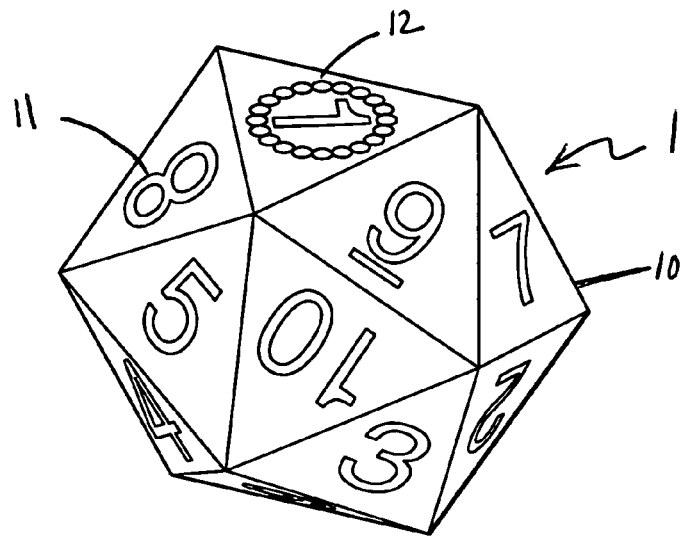
FIG. 1 shows a perspective view of a multi-sided die having authentication marks according to an embodiment of the invention.

Referring now in detail to the drawings, FIG. 1 shows multi-sided die 1 having a plurality of sides 10 of substantially equal area. Multi-sided die 1 may have, for example, 6 sides or 20 sides. Each side of multi-sided die 1 has a visible marking 11 for indicating a result of a roll or throw of multi-sided die 1. Visible markings 11 may be for example arabic or roman numerals, letters, dots, colors or any other suitable indicia.

One or more of visible markings 11 include a substance which reacts visibly with invisible ultraviolet light. This substance may be, for example a phosphor-containing ink, paint or dye which glows or fluoresces in the presence of ultraviolet light. The substance which reacts visibly in the presence of ultraviolet light may be chosen from among various types which glow or fluoresce in various colors.

Multi-sided die 1 has a plurality of authentication marks 12 disposed on one or more of sides 10. Authentication marks 12 are arranged in a selected pattern, for example a circle. One or more of authentication marks 12 may also include a substance which reacts visibly with ultraviolet light which is not visible to the human eye. This substance may be the same as or different from the substance included on one or more visible markings 11.

Figure 2:
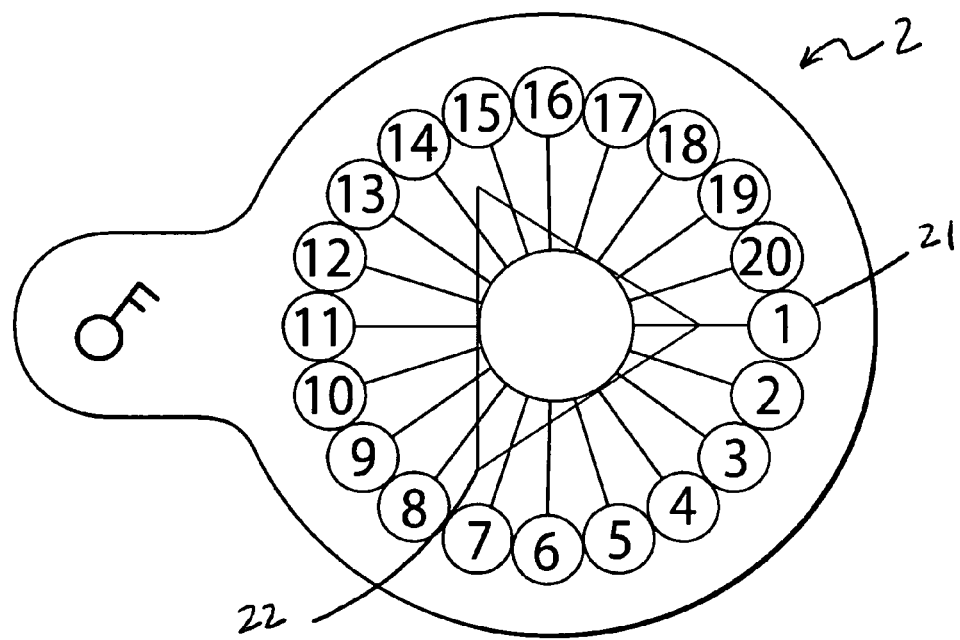
FIG. 2 shows a top view of an overlay key according to an embodiment of the invention.

Overlay key 2, as shown in FIG. 2 may be used to correlate a position of an authentication mark 12 with a visible marking 11 on a side 10 of multi-sided die 1. Overlay key 2 may comprise, for example a thin transparent or translucent device imprinted with markings 21 which correspond to visible markings 11 on die 1. Overlay key markings 21 are arranged in a patterns which corresponds to a pattern of authentication marks 12 such that overlay key 2 may be used to correlate a position of an authentication mark 12 with a visible marking 11. Multi-sided die 1 and a corresponding overlay key 2 may be provided as a set or unit.

Figure 3:
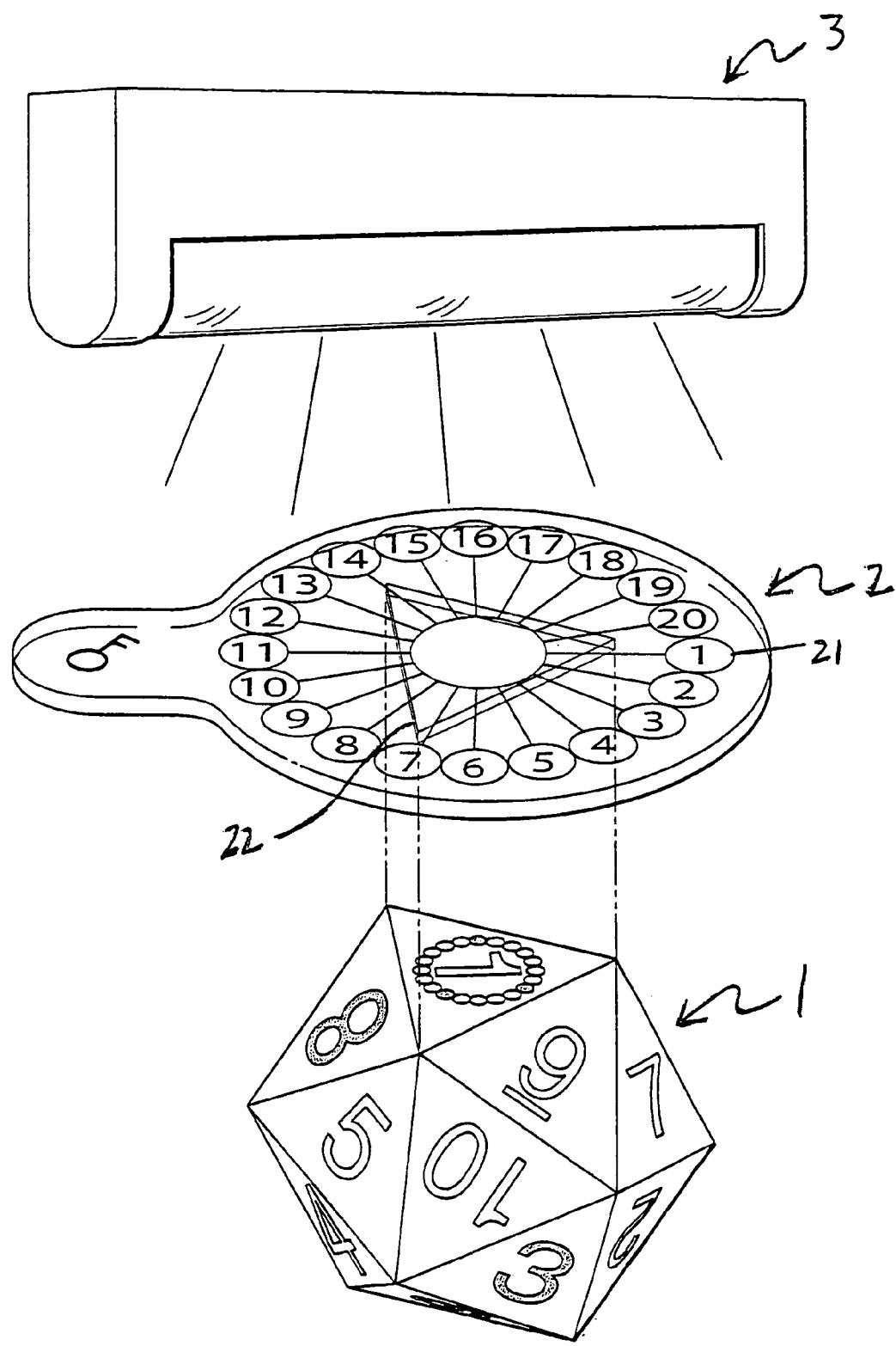
FIG. 3 shows a perspective view of a multi-sided die having authentication marks and an overlay key according to an embodiment of the invention with a ultraviolet light source acting on the die and overlay key.

As shown in FIG. 3, in use overlay key 2 may be placed or positioned on multi-sided die 1. Overly key 2 may include a recessed area 22 on a bottom surface of overlay key 2 for positioning overlay key 2 on a side of multi-sided die 1 having one or more authentication marks 12. Recessed area 22 may have a shape which substantially conforms to a shape of a side of multi-sided die 1.

A source of invisible ultraviolet light 3, for example a black light, may be brought into proximity with multi-sided die 1 and overlay key 2. In the presence of invisible ultraviolet light from source 3, authentication marks 12 which are provided with a substance which reacts visibly with ultraviolet light, exhibit a visible effect, for example glowing or fluorescing. Such a visible effect is illustrated in FIG. 3 by darkened authentication marks in positions corresponding to visible markings "3", "8" and "16". Visible markings 11 which are provided with a substance which reacts visibly with ultraviolet light exhibit a similar visible effect. Such a visible effect is illustrated in FIG. 3 by darkened visible markings at "8" and "3". In an authentic die according to an embodiment of the invention as shown by way of example in FIG. 3, visible marking "16" (not seen) would also exhibit a visible reaction in the presence of ultraviolet light.

To authenticate multi-sided die 1, overlay key 2 is used to compare a position of an authentication mark 12 which is visibly reacting to ultraviolet light source 3 with a visible marking 11 which is visibly reacting to ultraviolet light source 3. In an authentic die according to an embodiment of the invention, a direct correspondence exists between authentication marks 12 which react visibly with ultraviolet light and visible markings 11 which react visibly with ultraviolet light.

By varying the number and position of authentication marks 21 having an ultraviolet light reacting substance as well as the color which an authentication mark 12 or visible marking glows, a multitude of combinations exist for an authenticating system according to the invention. Additionally, a sequence or order of markings 21 on overlay key 2 may be varied, thereby increasing a number of possible combinations.

By way of example, a multi-sided die according to an embodiment of the invention may be used in a game of chance involving wagering, such as craps. A person officiating the game such as a dealer, stickman, boxman or other casino official places an overlay key over the die and shines an invisible ultraviolet light source, such as a black light on the die. Authentication marks, arranged in a selected pattern on a side of the die and provided with a substance which reacts to the black light, visibly glow in the presence of the black light.

The casino official uses the overlay key to correlate the visibly reacting authentication marks to one or more sides of the die. The official rotates the die so that the black light shines on the corresponding sides of the die and confirms that the die sides corresponding to the visibly reacting authentication marks also react visibly to the black light. In this way, the die is quickly and easily verified as authentic without any characteristics which are apparent on ordinary observation. Additionally, the die is authenticated with a minimal disruption in the game.

Accordingly, while at least one embodiment of the present invention have been shown and described, it is obvious that many changes and modifications may be made thereunto without departing from the spirit and scope of the invention.

What is claimed is:

1. A system for authenticating a multi-sided die by viewing under ultraviolet light, the system comprising:
   (a) a die body having a plurality of sides of substantially equal area;
   (b) a plurality of visible markings disposed on said plurality of sides for indicating a result of a roll of the die, wherein one or more of said plurality of visible markings include a substance which reacts visibly in a presence of invisible ultraviolet light;
   (c) one or more authentication marks arranged in a selected pattern on one or more of said plurality of sides, wherein at least one of said one or more authentication marks comprises a substance which reacts visibly in the presence of invisible ultraviolet light and wherein a position of said at least one of said one or more authentication marks, comprising a substance which reacts visibly in the presence of invisible ultraviolet light, corresponds to one of said plurality of visible markings which include said substance which reacts visibly in the presence of invisible ultraviolet light;
   (d) an overlay key for correlating said position of said at least one of said one or more authentication marks comprising a substance which reacts visibly in the presence of invisible ultraviolet light marks with said visible marking including said substance which reacts visibly in a presence of invisible ultraviolet light.

2. The system for authenticating a multi-sided die by viewing under ultraviolet light according to claim 1, wherein said plurality of sides of substantially equal area comprises twenty sides.

3. The system for authenticating a multi-sided die by viewing under ultraviolet light according to claim 1, wherein said plurality of visible markings comprise arabic numerals.

4. The system for authenticating a multi-sided die by viewing under ultraviolet light according to claim 1, wherein said plurality of visible markings each comprise a unique marking and wherein a number of said unique markings is equal to a number of said plurality of sides.

5. The system for authenticating a multi-sided die by viewing under ultraviolet light according to claim 1, wherein said one or more authentication marks arranged in said selected pattern are arranged in a circular pattern.

6. The system for authenticating a multi-sided die by viewing under ultraviolet light according to claim 1, wherein said overlay key further comprises plurality of visible marks corresponding to said plurality of visible markings, wherein said plurality of visible marks are arranged in a pattern corresponding to said selected pattern of said one or more authentication marks.

7. The system for authenticating a multi-sided die by viewing under ultraviolet light according to claim 1, wherein said overlay key further comprises a recessed area having a shape which substantially conforms to a shape of one of said plurality of sides of said die body.

8. A method for authenticating a multi-sided die, the method comprising the steps of:
   (a) providing one or more visible markings disposed on a side of the multi-sided die with a substance which reacts visibly in a presence of an invisible ultraviolet light;
   (b) arranging one or more authentication marks in a selected pattern on one or more sides of the multi-sided die, wherein at least one of said one or more authentication marks comprises a substance which reacts visibly in the presence of invisible ultraviolet light and wherein a position of said at least one of said one or more authentication marks, comprising a substance which reacts visibly in the presence of invisible ultraviolet light, corresponds to one of said visible markings provided with said substance which reacts visibly in the presence of invisible ultraviolet light;

(c) aligning an overlay key on a side of the multi-sided die having said authentication marks, wherein said overlay key correlates a position of said at least one of said one or more authentication marks comprising a substance which reacts visibly in the presence of invisible ultraviolet light with one of said visible markings provided with said substance which reacts visibly in the presence of invisible ultraviolet light;

(d) viewing the multi-sided die with a source of invisible ultraviolet light; and (e) confirming that said position of said at least one of said one or more authentication marks comprising a substance which reacts visibly in the presence of invisible ultraviolet light corresponds to one of said visible markings provided with said substance which reacts visibly in the presence of invisible ultraviolet light.

* * * * *